(12) United States Patent
Lei et al.

(10) Patent No.: US 8,446,899 B2
(45) Date of Patent: May 21, 2013

(54) METHOD AND MEANS FOR ROUTE SELECTION OF A SESSION

(75) Inventors: Zhengxiong Lei, Shanghai (CN); Xueqiang Yan, Shanghai (CN)

(73) Assignee: Alcatel Lucent, Paris (FR)

( * ) Notice: Subject to any disclaimer, the term of this patent is extended or adjusted under 35 U.S.C. 154(b) by 459 days.

(21) Appl. No.: 12/450,072

(22) PCT Filed: Mar. 26, 2008

(86) PCT No.: PCT/CN2008/000595
§ 371 (c)(1),
(2), (4) Date: Sep. 10, 2009

(87) PCT Pub. No.: WO2008/116389
PCT Pub. Date: Oct. 2, 2008

(65) Prior Publication Data
US 2010/0046502 A1 Feb. 25, 2010

(30) Foreign Application Priority Data
Mar. 27, 2007 (CN) .......................... 2007 1 0038541

(51) Int. Cl.
*H04L 12/66* (2006.01)
(52) U.S. Cl.
USPC ........................................................ 370/352
(58) Field of Classification Search
None
See application file for complete search history.

(56) References Cited

U.S. PATENT DOCUMENTS

| 2004/0043776 A1* | 3/2004 | Tuomela et al. ............ 455/456.3 |
| 2004/0240389 A1* | 12/2004 | Bessis et al. .................. 370/252 |
| 2005/0122942 A1 | 6/2005 | Rhee et al. |
| 2006/0039397 A1* | 2/2006 | Hari et al. ..................... 370/431 |

FOREIGN PATENT DOCUMENTS

| CN | 1588927 | 3/2005 |
| CN | 1859285 | 6/2005 |
| CN | 1713750 | 12/2005 |

* cited by examiner

*Primary Examiner* — Yong Zhou
(74) *Attorney, Agent, or Firm* — Harness, Dickey & Pierce, P.L.C.

(57) ABSTRACT

In the present invention, it is provided a method and means for selecting a route for a session requested by a calling user equipment in a session manager, and correspondingly, it is provided a method and means for selecting a route for a session requested by a calling user equipment in a media gateway control function, it is characterized as selecting an MGW having relative lighter load to bear the session on a basis of load related information of MGWs. By applying the methods and means of the present invention, load of every MGW is balanced; performance degradation, caused by heavy load, of a certain MGW is avoided; MGW having stopped working is bypassed; a success ratio of session setup is increased; session performance is improved; and benefit is brought to multi-network integration, such as inter-working between a packet switching network and a circuit switching network in an IMS network.

34 Claims, 11 Drawing Sheets

METHOD AND MEANS FOR ROUTE SELECTION OF A SESSION

FIELD OF THE INVENTION

This invention relates to a communication network, especially relates to a session manager and a media gateway control function in a communication network.

BACKGROUND OF THE INVENTION

TRIP (Telephony Routing over IP) protocol defined in IETF RFC3219 provides a method of exchanging route information in an operator domain (such as ITAD, Internet Telephony Administrative Domain), i.e. among LSs (Location Server). However, TRIP does not define how to select a specific MGW (Media Gateway) to set up a connection for a call requested by a phone, and there is no routing scheme defined in LSs either.

Draft-ietf-iptel-tgrp defines TGREP (Telephony Gateway Registration Protocol). TGREP allows PSTN (Public Switched Telephone Network) gateways or switches to inform a signaling server, such as BGCF (Breakout Gateway Control Function) or MGCF (Media Gateway Control Function), of the signaling server's routes to PSTN. Advertisement information includes fairly dynamic information, such as remaining capacity in a particular trunk. However, TGREP only specifies how to collect the dynamic information and does not specify how the signaling server selects an MGW based on the collected information.

3GPP and TISPAN (Telecommunications and Internet converged Services and Protocols for Advanced Networking) specify that there must be a routing function in BGCF, but they do not specify routing schemes or routing algorithms.

Currently, in a network based on H.323 or ordinary Internet VoIP, a signaling server selects an MGW by applying a polling method or a random selection method.

MGW is a breakout point where a session, requested by a UE (User Equipment) to be set up, is transferred from a packet switching domain to a circuit switching domain. Performance and reliability of an MGW plays a very important role in providing a successful session. If an MGW is selected by applying a polling method or a random selection method, during heavy traffic period, an MGW having load heavier than a certain level will experience a sudden degradation of performance or even a breakdown, because the MGW's load is too heavy. Therefore, service quality of the network will decrease sharply, which may lead sessions to be terminated or not be able to be set up.

SUMMARY OF THE INVENTION

To overcome the above mentioned defects in current technical solutions, it is provided a method and means for selecting a route for a session requested by a calling user equipment in a session manager, and corresponding methods and means for selecting a route for a session requested by a user equipment in a media gateway control function.

According to a first aspect of the present invention, it is provided a method of selecting a route for a session requested by a calling user equipment in a session manager in a communication network. And the method comprises: a. receiving a session request message for requesting to set up the session from the calling user equipment; and b. selecting the route for the session based on load related information of a plurality of media gateways controlled by the session manager.

According to a second aspect of the present invention, it is provided a method of selecting a route for a session requested by a user equipment in a media gateway control function in a communication network, and the method comprises: i. receiving, via a session manager, a session request message for requesting to set up the session from the user equipment and receiving, from the session manager, indication information for indicating a media gateway selected by the session manager to bear the session; and ii. selecting, based on the indication information, a corresponding media gateway to bear the session.

According to a third aspect of the present invention, it is provided a method of selecting a route for a session requested by a user equipment in a media gateway control function in a communication network, and the method comprises: I. receiving, via a session manager, a session request message for requesting to set up the session from the user equipment; and II. selecting, based on load related information of a plurality of media gateways controlled by the media gateway control function, a media gateway having relative lighter load from the plurality of media gateways to bear the session.

According to a fourth aspect of the present invention, it is provided a first route selection means for selecting a route for a session requested by a calling user equipment in a session manager in a communication network, and the means comprises a first receiving means and a first controlled selection means. The first receiving means is configured to receive a session request message for requesting to set up the session from the calling user equipment; and the first controlled selection means is configured to select the route for the session based on load related information of a plurality of media gateways controlled by the session manager.

According to fifth aspect of the present invention, it is provided a second route selection means for selecting a route for a session requested by a user equipment in a media gateway control function in a communication network, and the means comprises a second receiving means and a second controlled selection means. The second receiving means is configured to receive, via a session manager, a session request message for requesting to set up the session from the user equipment and receive, from the session manager, indication information for indicating a media gateway selected by the session manager to bear the session; and the second controlled selection means is configured to select, based on the indication information, a corresponding media gateway to bear the session.

According to a sixth aspect of the present invention, it is provided a third route selection means for selecting a route for a session requested by a user equipment in a media gateway control function in a communication network, and the means comprises a third receiving means and a third controlled selection means. The third receiving means is configured to receive, via a session manager, a session request message for requesting to set up the session from the user equipment; and the third controlled selection means is configured to select, based on load related information of a plurality of media gateways controlled by the media gateway control function, a media gateway having relative lighter load from the plurality of media gateways to bear the session.

By applying the methods and means of the present invention, load of every MGW is balanced; performance degradation, caused by heavy load, of a certain MGW is avoided; MGW having stopped working is bypassed; a success ratio of session setup is increased; session performance is improved; and benefit is brought to multi-network integration, such as inter-working between a packet switching network and a circuit switching network in an IMS (IP Multimedia Subsystem) network. In addition, MGCF collects load information of MGWs in real-time and there is no need to run other protocols, such as TGREP, so burden to a network is reduced.

DESCRIPTION OF THE DRAWINGS

The above and other objects, features and advantages of the present invention will become more apparent from the following detailed description of unrestricted embodiments considered in connection with the accompanying drawings.

DETAILED DESCRIPTION

Figure 1:
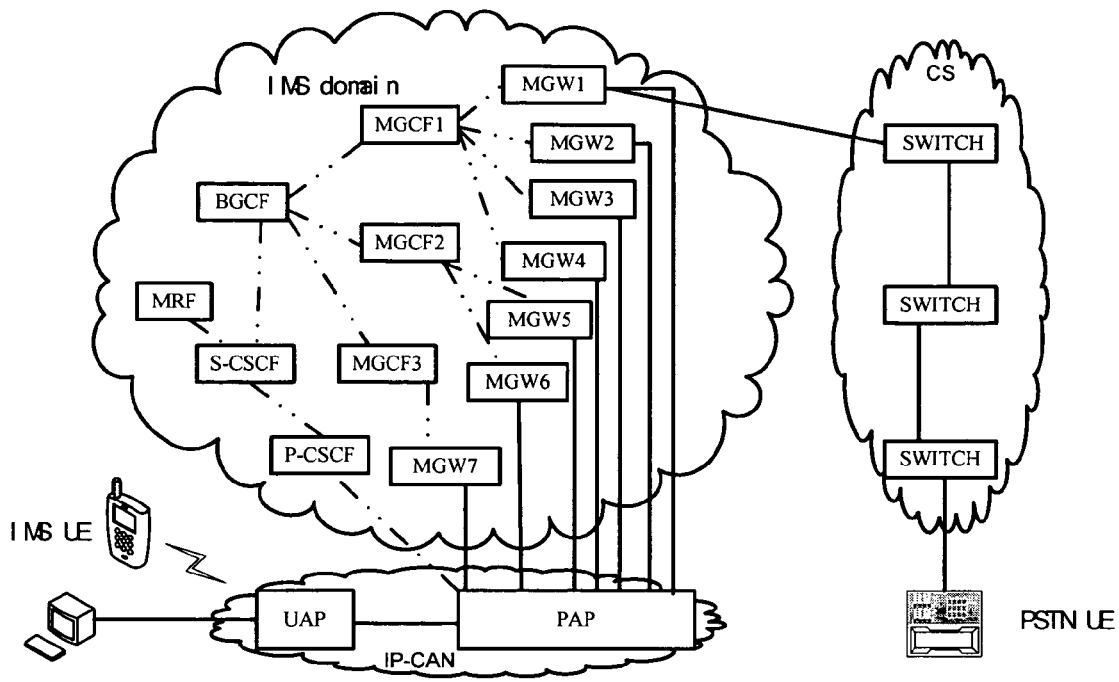
FIG. 1 depicts a schematic diagram of an application scenario of the present invention.

FIG. 1 depicts a schematic diagram of an application scenario of the present invention. There are IMS (packet switching domain) and circuit switching domain (CS). Circuit switching domain comprises a PSTN network or a mobile communication network. In IMS domain, a BGSF connects with one or multiple MGCFs (MGCF1, MGCF2, MGCF3, MGCF4), one MGCF control one or multiple MGWs. An IMS UE accesses to the network via IP-CAN (IP-Connectivity Access Network), and IP-CAN comprises two parts which are a UAP (User Access Point) and a PAP (Packet Access Point). There can be many types of UAP and PAP, for example, the UAP can be a service GPRS support node, a WLAN access gateway or a DSLAM (Digital subscriber line access multiplexer) and the PAP can be a GPRS gateway support node, a WLAN packet data gateway or a broadband access server. There is no direct relationship between types of IP-CAN and the object of the present invention, and no extra description of it will be given.

In FIG. 1, when a session request message from an IMS UE arrives at a S-CSCF (Serving-Call Session Control Function), the S-CSCF identifies that the requested UE is a PSTN UE and routes the session request message to the BGCF. Then the BGCF selects an MGCF which controls an MGW having the lightest load and forwards the session request message to the MGCF. Then the MGCF selects, from MGWs controlled by it, an MGW having the lightest load to bear the session requested by the session request message. It means that whenever an IMS UE calls a PSTN UE, the call will be routed to an MGW having the lightest route. In this way, load of every MGW is balanced; performance degradation, caused by heavy load, of a certain MGW is avoided; MGW having stopped working is bypassed; a success ratio of session setup is increased; and session performance is improved;

For better understanding, a defining method of load of an MGW is given here, and persons skilled in the art can understand that the present invention is not limited to this kind of defining method. Load of an MGW is the ratio between the number of channels being used for sessions and the capacity of the MGW, and the capacity of the MGW is the maximal number of channels that can be used for sessions. The load is set as 1 if an MGW stops working.

Each MGCF collects load information of MGW controlled by it in real time. Currently, H.248 protocol is widely used for communication between MGWs and MGCFs. For better understanding of the present invention, brief description of the part relevant to the present invention in the protocol is given as follows. More information can be found in relevant parts of H.248 protocol.

H.248 protocol is a media gateway control protocol proposed by ITU-T Study Group 16 in the year of 2000. It is developed based on an earlier version of MGCP (Media Gateway Control Protocol), and it should be attributed to efforts of both ITU-T and IETF. ITU-T calls it as H.248, while IETF calls it as MeGaCo. H.248/MeGaCo is a gateway control protocol used to connect an MGCF and an MGW. It is applied between a media gateway and a soft switch and between a soft switch and a H.248/MeGaCo UE, and it is an important protocol should be supported by a soft switch.

Connection models defined in H.248 mainly comprises two concepts: termination and context. A termination is a logical entity in an MGW and it can transmit and receive one or multiple kinds of media stream. Types of terminations mainly comprise semi-permanent terminations (TDM channels or analog lines) and temporary terminations (such as RTP stream, signals to bear a voice, data and video, or all kinds of hybrid signals). Properties, events, signals and statistics are used to present characteristics of a termination. To hide the diversity of terminations, a concept of package is introduced to the protocol and all kinds of characteristics of a termination are grouped into a package.

Context is an association between a number of terminations and it describes topology relationship between terminations and mixing/exchanging parameters of media. A context can be created by a command of Add, and can be deleted by a command of Substract or Move. A termination can belong to only one context at a moment. A topology descriptor is an important feature of a context. By setting topology relationship of a context, flow direction of media among terminations in the context can be easily changed. And flow direction of media that is not in the context is specified by stream models (Send/Receive, Send Only, Receive Only). Characteristics of media stream among terminations are described by a stream descriptor and different steams can bear different types of media. When there are multiple types of media in a stream, system should do type conversion automatically.

H.248 protocol bears some dynamic information, such as call setup, call termination, and gateway collapse, etc. Therefore MGCF can calculate load information of every MGW controlled by it on a basis of information flow of H.248 between it and MGWs without using extra protocols such as TGREP protocol.

AN MGCF can obtain status of contexts and terminations in every MGW on a basis of response information of H.248 from every MGW and then calculating the number of session channels being used in every MGW. For example, based on an MGW's response to a SUBSTRACT message of H.248, a contexts consisting of two terminations is deleted and the mode attribute is Send/Receive, and then it is determined that a session channel is released in the MGW. If a context consisting of two terminations is created or added and the attribute is Send/Receive, then it is determined a session channel is added in the MGW. Based on the capacity of the MGW known in advance, i.e. the maximal number of session channels that the MGW can provide, the MGCF calculates load of every MGW. The load is set as 1 if an MGW stops working (due to heavy load or other reasons). Load information table of every MGW, such as Table 1, can be stored in every MGCF. It should be explained that the number of channels bearing sessions can also be counted and then sent to the MGCF by MGWs.

TABLE 1

| MGW identifier | IP address | Load |
|---|---|---|
| 1 | 59.64.165.211 | 0.3 |
| 2 | 59.64.165.201 | 0.5 |
| 3 | 59.64.165.203 | 0.7 |
| 4 | 59.64.165.207 | 0.4 |
| ... | ... | ... |

In a BGCF, MGCF groups can be classified according to area codes, and information as shown in Table 2 is stored in a BGCF. A group of MGCFs associated with a same area code usually locate in or is near the area represented by the area code. The present invention is not limited to the way that classifies MGCF groups according to area codes. In practical operation, MGCF groups can be flexibly defined by network operators according to network topology.

TABLE 2

| Area Code | MGCF ID in group |
|---|---|
| 021 | MGCF1, MGCF2, MGCF3, MGCF4 |
| 0512 | MGCF5, MGCF2, MGCF3, MGCF6 |
| 020 | MGCF7, MGCF8, MGCF9, |
| ... | ... |

A BGCF can inquire load related information of MGWs controlled by each MGCF of every MGCF, or every MGCF transmits load related information of MGWs controlled by each MGCF to the BGCF periodically. Optionally, an MGCF can transmit load information of each MGW to the BGCF when load of each MGW changes. Preferably, an MGCF can only transmit load information of an MGW having the lightest load to the BGCF in order to reduce network traffic between every MGCF and the BGCF. The BGCF can store the received information in, but not limited to, the way shown in Table 3.

TABLE 3

| MGCF ID | IP address | Lightest load |
|---|---|---|
| 1 | 59.64.158.234 | 0.3 |
| 2 | 59.64.162.132 | 0.4 |
| 3 | 59.64.142.111 | 0.5 |
| 4 | 59.64.192.102 | 0.6 |
| ... | ... | ... |

Figure 2:
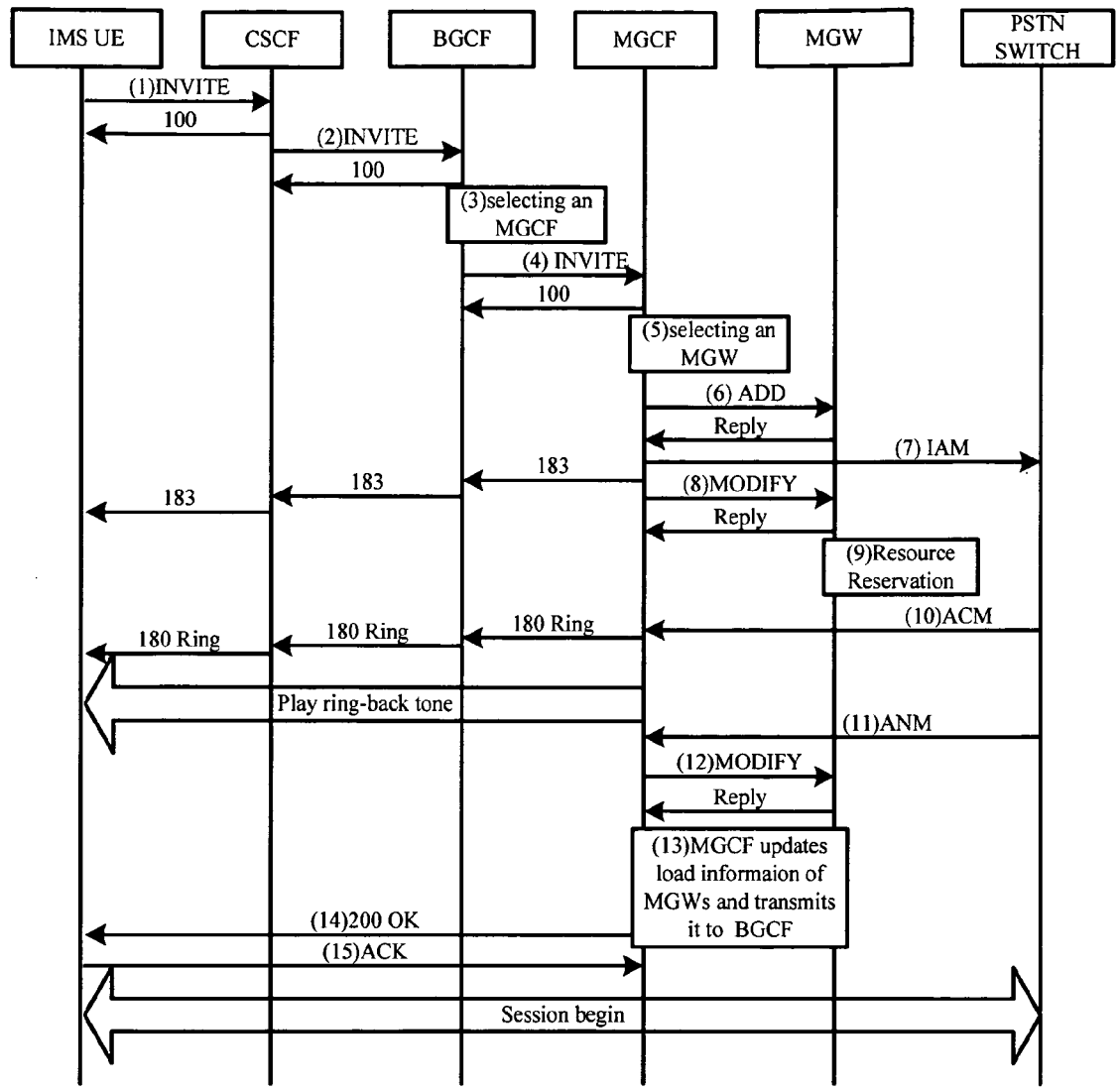
FIG. 2 depicts a schematic diagram of a session setup process according to an embodiment of the present invention.

Referring to FIG. 1 and FIG. 2, one embodiment of the present invention is described in detail as follows along with the description of a complete process of setting a session.

If a network topology is an IMS network topology based on SIP (Session Initiation Protocol) as shown in FIG. 1, when a session request message from a calling IMS UE arrives at a BGCF, the BGCF determines a corresponding MGCF group on a basis of the phone number of a called UE, selects an MGCF which controls an MGW having a lightest load on a basis of method of present invention, and transmits the session request message to the MGCF. Then the MGCF selects an MGW having a lightest load from MGWs controlled by it to bear the session.

Detailed session process is shown as in FIG. 2.
(1) An IMS UE sends an INVITE message to an S-CSCF;
(2) The S-CSCF forwards the INVITE message to a BGCF;
(3) The BGCF obtains a called number from the INVITE message, determines an MGCF group associated with the call on a basis of the called number and Table 2, if the called number is 021-54213663, and then the corresponding MGCF group is the group consisting of MGCF1, MGCF2, MGCF3 and MGCF4;
(4) The BGCF determines an MGCF controlling an MGW having the lightest load. From Table 3, it can be found that MGCF1 controls an MGW having the lightest load, the BGCF forwards the INVITE message to MGCF1;
(5) MGCFQ receives the INVITE message from BGCF, finds that MGW1 has the lightest load according to Table 1 and selects MGW1 to bear the session;
(6) MGCF1 sends an ADD command of H.248 to MGW1 and controls MGW1 to create a context, MGW1 sends a Reply message of H.248 to MGCF1, the Reply message comprises attributes of the created context, and current attributes of the created context is Send Only;
(7) MGCF1 maps the INVITE message as an IAM (Initial Address Message) message and sends it to a PSTN network, MGCF1 sends a 183 response message to the IMS UE;
(8) MGCF1 sends a MODIFY command of H.248 to modify the contexts created in step (6), for example, to modify characteristics of a TDM termination corresponding to the called UE, the characteristics comprises sending ringing signal to the called UE and monitoring off-hook signal of the called UE;
(9) MGW1 reserves channel resource for the session;
(10) MGCF1 receives an ACM (Address Complete Message) message from PSTN and then sends a 180 response message to the IMS UE, the IMS UE receives a ring back tone;
(11) MGCF1 receives an ANM (Answer Message) message after the PSTN UE off-hooks;

(12) MGCF1 sends a MODIFY command of H.248 to the MGW1, modifies model attributes of the context into Send/Receive, MGW1 sends a Reply message to the MGCF1;
(13) MGCF1 receives a Reply message from MGW1, modifies load information of MGW1 in Table 1 according to the response message, and reports to the BGCF;
(14) MGCF1 sends a 200 Ok response message to the IMS UE; and
(15) The IMS UE sends an ACK message.

In this way, a complete session setup process is finished and the IMS UE can communicate with the PSTN UE. Specific forms of messages in the above call process will not be elaborated here and they can be found by referring to SIP and No. 7 signaling protocol.

In network operated by different operators, the above session setup process can be slightly different. In addition, the session can be from circuit switching domain to packet switching domain and then to circuit switching domain. The session can comprise services of voice call, real-time video transmission and video call. The process of route selection can be the same in a BGSF and an MGCF.

Figure 3:
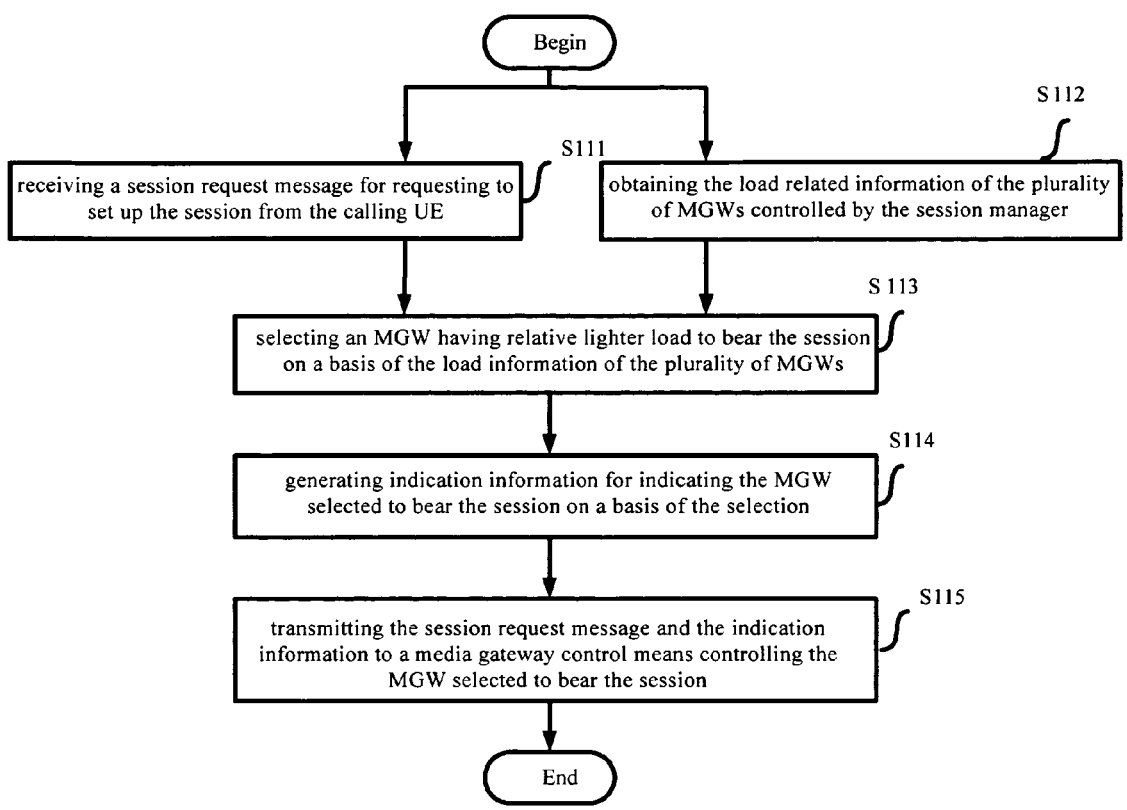
FIG. 3 depicts a schematic diagram of a flowchart of a method of selecting a route for a session requested by a calling UE to be set up in a session manager according to an embodiment of the present invention.

FIG. 3 depicts a schematic diagram of a flowchart of a method of selecting a route for a session requested by a calling UE to be set up in a session manager according to an embodiment of the present invention Firstly, in step S111, a session request message for requesting to set up the session is received from the calling user equipment and in step S112, the load related information of the plurality of MGWs controlled by the session manager is obtained.

Because the present invention only relates to improvement of methods in a session manager and a media gateway control function, routes of the session request message before it arrives at the session manager doesn't relate to the object of the present invention and is not elaborated here.

For the IMS network structure as shown in FIG. 1, the session manager is a BGCF. For a BGCF, there are two methods to get load information of an MGW: one is that the BGCF directly communicates with every MGW to obtain load related information of every MGW; another is that an MGCF obtains the load related information of every MGW controlled by the MGCF and then transmits the load related information to the BGCF. The latter method is more preferable.

It needs to be explained that the order between step S111 and step S112 is not fixed. In practical operation, there are many way of implementation. One choice is to inquiry the load related information of every MGW after receiving every session request message; another choice is to inquiry or to receive the load related information of every MGW periodically.

Then, the session manager selects a route for the session requested by the session request message received in step S111 on a basis of the load related information of every MGW obtained in step S112. There are two solutions for the route selection. One is that the session manager selects an MGW to bear the session on a basis of the load related information of every MGW and informs the selection to a media gateway control function. The other is that the session manager selects a media gateway control function controlling at least one MGW having relative lighter load on a basis of the load related information of every MGW, and then the media gateway control function selects an MGW having relative lighter load to bear the session on a basis of load related information of every MGW controlled by the media gateway control function. Steps S113 to S114 shows a schematic diagram of a flowchart of the former solution.

Firstly, in step S113, an MGW having relative light load is selected to bear the session on a basis of load related information of the plurality of MGW, preferably, an MGW having lightest load is selected to bear the session.

Secondly, in step S114, indication information is generated on a basis of the selection in step S113, and the indication information is for indicating the MGW selected to bear the session.

Then, in step S115, the session request message and the indication information is transmitted to the media gateway control function. The indication information can be comprised in the session request message and transmitted to the media gateway control function together. The indication information and the session request message can also be transmitted separately.

Figure 4:
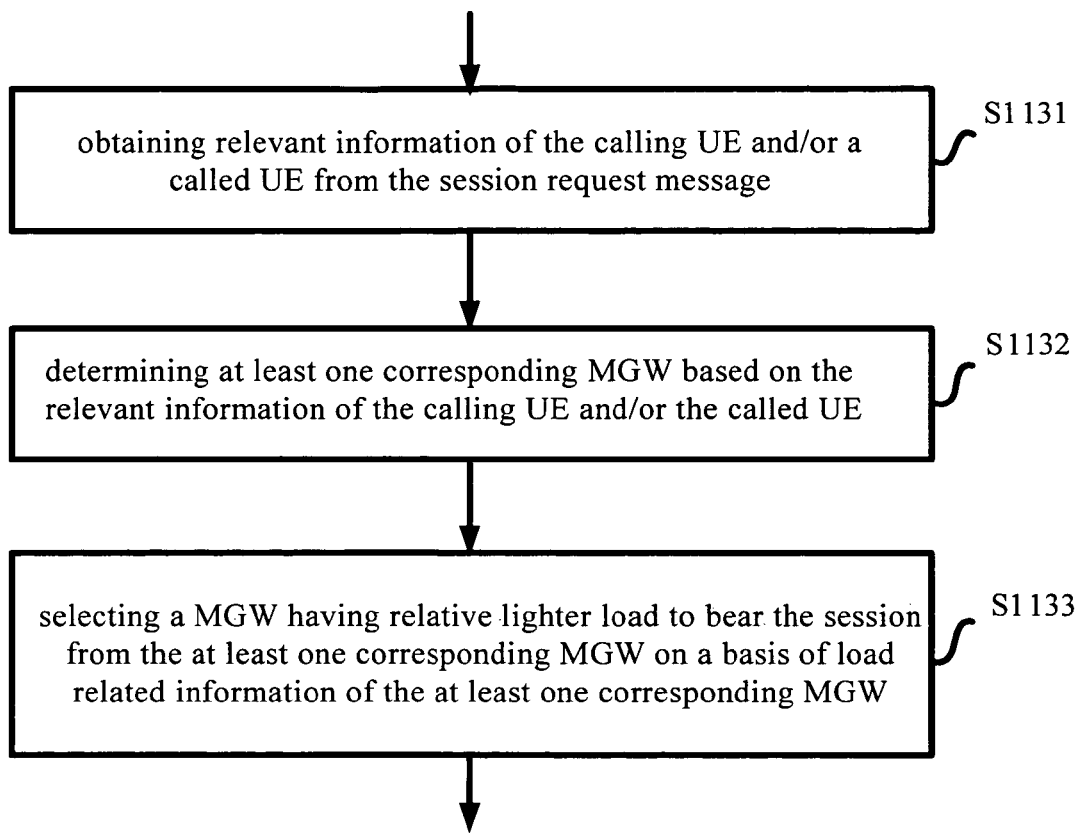
FIG. 4 depicts a schematic diagram of a flowchart of a method of selecting, based on relevant information of a calling UE and/or a called UE and load information of MGWs, an MGW to bear a session requested by a calling UE to be set up in a session manager according to an embodiment of the present invention.
Figure 5:
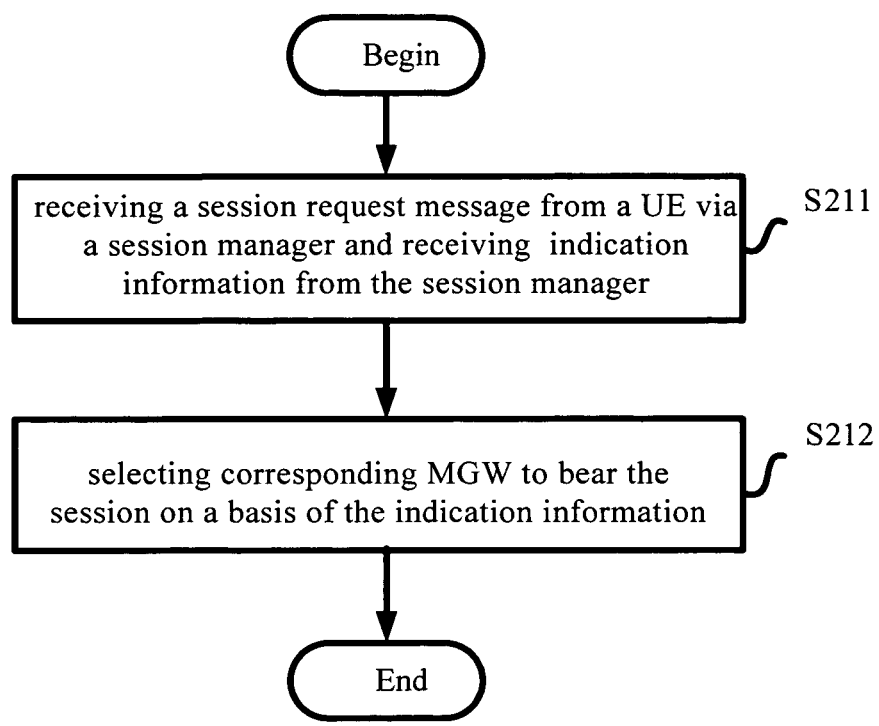
FIG. 5 depicts a schematic diagram of a flowchart of a method of selecting a route for a session requested by a calling UE to be set up in a media gateway control function according to an embodiment of the present invention.
Figure 6:
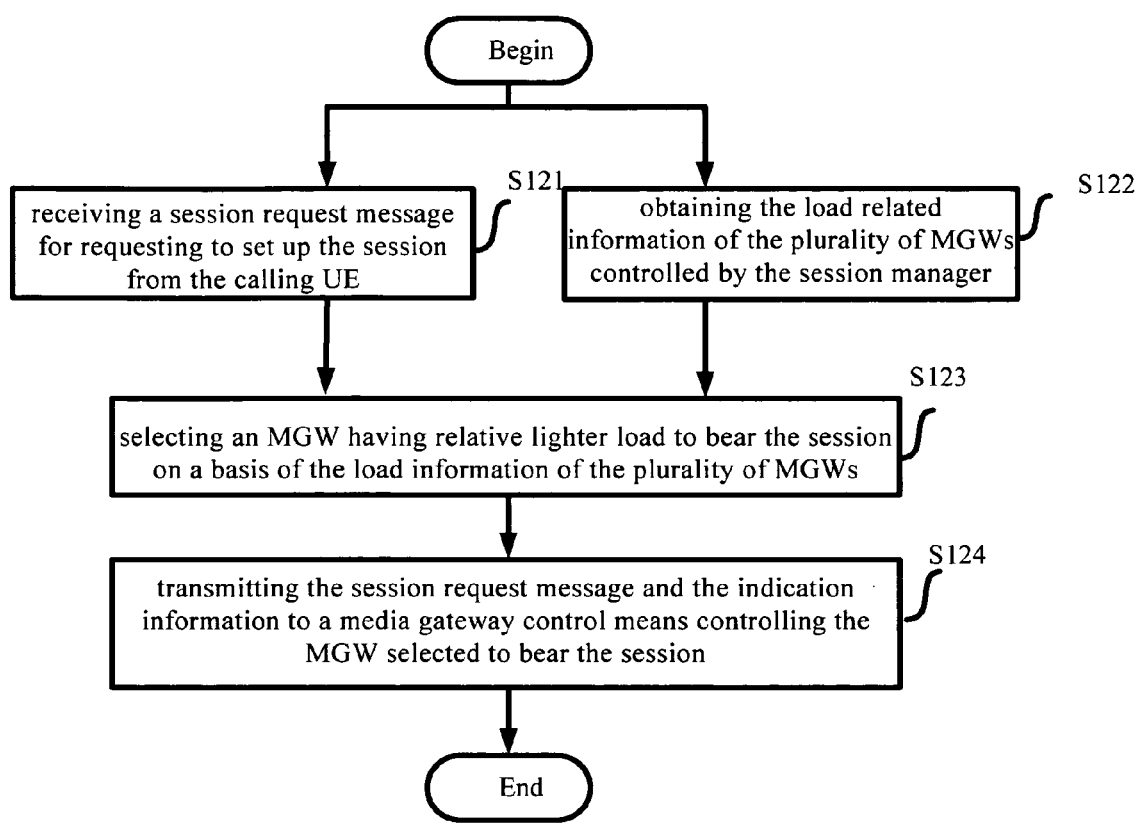
FIG. 6 depicts a schematic diagram of selecting a route for a session requested by a calling UE to be set up in a session manager according to an embodiment of the present invention.

In addition, in step S113, an MGW is selected to bear the session on a basis of relevant information of the calling UE and the called UE and the load related information of MGWs. FIG. 4 shows one embodiment of a change of step S113.

Firstly, in step S1131, the relevant information of the calling and/or called UE is obtained from the session request information received in step S111; the relevant information of the calling UE comprises a calling ID and a current location area of the calling UE; the relevant information of the called UE comprises a called ID and a current location area of the called UE. The calling/called ID comprises a fixed phone number, a mobile phone number or a calling/called ID obtained according to ENUM mechanism.

Then, in step S1132, one or multiple corresponding MGWs is determined based on the relevant information of the calling and/or called UE. Preferably, one or multiple corresponding MGWs having a relative shorter network distance to the called UE is determined based on the relevant information of the called UE. The concept of network distance means network path that a packet bearing a session passes by, i.e., the number of routers that a packet bearing a session passes by from an MGW to a UE, i.e., the number of hops. If the number of hops is small, the network distance is determined as short; if the number of hops is big, the network distance is determined as far.

Finally, in step S1133, an MGW having relative lighter load is selected to bear the session from the one or multiple corresponding MGWs on a basis of load related information of the one or multiple corresponding MGWs, preferably, an MGW having the lightest load is selected to bear the session.

SIP marks an address of a user in the form of an E-mail address and we call it as a SIP address. When a user registers, a number corresponding to an SIP address, such as a PSTN phone number, is allocated. When an S-CSCF identifies that a called UE is a PSTN UE, a SIP address of the UE is transferred into a corresponding PSTN number of the UE, so that a PSTN UE can identify the number and dial back or do other operations. Correspondingly, when a PSTN user dials back, a server in IMS, such as a MGCF, does a corresponding address transfer operation via ENUM mechanism to transfer the PSTN number into a SIP address.

For example, when an IMS phone user in Guangzhou calls a PSTN phone user in Shanghai via an IP network, it is supposed that the phone number of the IMS phone user in Guangzhou is 020-65565665 (or a SIP address, the session manager can obtain the geography location of the user by inquiring the registration information of the user), the phone number of the PSTN phone user in Shanghai is 021-50553033, and the session manager obtains numbers of the calling and called UEs from the received session request message. It is also supposed that the session manager takes charge of breakout gateway control function in South China and East China, MGCF group is classified according to PSTN area code (or administrative divisions), information as shown in Table 2 is pre-stored, and obtained load related information of MGWs is stored in the form of Table 4. The load related information of every MGW shown in Table 4 is updated dynamically. Person skilled in the art can understand that storage of the load related information of every MGW is not limited to the form in Table 4 and Table 4 is just for illustrative purpose.

Preferably, firstly, one or more MGWs having a relative shorter network distance to the called UE is determined on a basis of the phone number of the called UE. The concept of network distance means network path that a packet bearing a session passes by, i.e., the number of routers that a packet bearing a session passes by from an MGW to a UE, i.e., the number of hops. If the number of hops is small, the network distance is determined as short; if the number of hops is big, the network distance is determined as far.

TABLE 4

| MGCF ID | IP address | Controlled MGW | Load of MGW |
|---------|------------|----------------|-------------|
| 1 | 59.64.158.234 | MGW11 | 0.3 |
|   |               | MGW12 | 0.4 |
|   |               | MGW13 | 0.2 |
| 2 | 59.64.162.132 | MGW21 | 0.3 |
|   |               | MGW22 | 0.5 |
|   |               | MGW23 | 0.4 |
| 3 | 59.64.142.111 | MGW31 | 0.6 |
|   |               | MGW32 | 0.5 |
|   |               | MGW33 | 0.7 |
| 4 | 59.64.192.102 | MGW41 | 0.3 |
|   |               | MGW42 | 0.5 |
|   |               | MGW43 | 0.5 |
| ... | ... | ... | |

The area code of the called UE is 021, every MGW controlled by MGCF1, MGCF2, MGCF3 and MGCF4 is determined as the corresponding MGW on a basis of Table 2 and Table 4. Then MGW13 having the lightest load is selected to bear the session on a basis of load information of every MGW in Table 4, the selection is informed to controlling MGW13, the session request message is transmitted to MGCF1 and the setup process of the session is completed by MGW13 under the control of MGCF1.

It is not limited to determining one or multiple MGWs having a relative shorter network distance to the called UE on a basis of the phone number of the called UE. One or multiple MGWs having a relative shorter network distance to the called UE can also be determined on a basis of the phone number (or a SIP address, the session manager can obtain the geography location of the user by inquiring the registration information of the user) of a calling UE. The corresponding one or multiple MGWs can also be determined on a basis of the phone numbers of the calling and called UEs. For example, when an IMS UE in Guangzhou calls a PSTN UE in Shanghai, one or multiple MGWs taking charge of breakout function of Hangzhou are selected as a breakout point from IMS domain to PSTN domain.

FIG. 4 depicts a schematic diagram of a flowchart of a method of selecting a route for a session requested by a calling UE to be set up in a media gateway control function in a communication network according to an embodiment of the present invention. The method corresponds to the first route selection solution in the session manager.

Firstly, in step S211, a session request message, from a UE, for requesting to set up a session is received via a session manager, and indication information is received from the session manager. The indication information is configured for indicating an MGW selected by the session manager to bear the session.

Then, in step S212, a corresponding MGW is selected to bear the session on a basis of the indication information.

For an IMS network, the media gateway control function is an MGCF. When a BGCF selects MGW13 to bear the session and sends indication information to MGCF1 to inform the selection, MGCF1 controls MGW13 to set up the session after receiving the indication information and the session request message.

Preferably, the media gateway control function obtains load related information of a plurality of MGWs controlled by it and transmits the load related information to the session manager. The load related information of the plurality of MGWs can comprise load information of every MGW, load information of several MGWs having relative lighter load, or load information of an MGW having the lightest load.

Detailed description is given as above for the first route selection solution in the session manager, i.e. the session manager selects an MGW to bear the session on a basis of load related information of a plurality of MGWs and informs the selection to the media gateway control function, and then the media gateway control function set up the session according to the selection of the session manager. Detailed description will be given as below for the second route selection solutions, i.e. a media gateway control function controlling MGWs having relative lighter load is selected on a basis of load related information of every MGW, and the media control means selects an MGW having relative lighter load to bear the session on a basis of load information of every MGW controlled by the media control means.

For the second route selection in the session manager, the first two steps S121 and S122 are the same as the first two steps S111 and S113 as shown in FIG. 3, and can be referred to steps S111 and S112 in the first route selection solution described above. For the aim of simplicity, it is not elaborated here.

Then, in step S123, a media gateway control function controlling MGWs having relative lighter load is selected to control setup of the session on a basis of load related information of the plurality of MGWs, preferably, a media gateway control function controlling an MGW having the lightest load is selected to control setup of the session.

Finally, in step S124, the session request message is transmitted to the selected media gateway control function controlling MGWs having relative lighter load.

Figure 7:
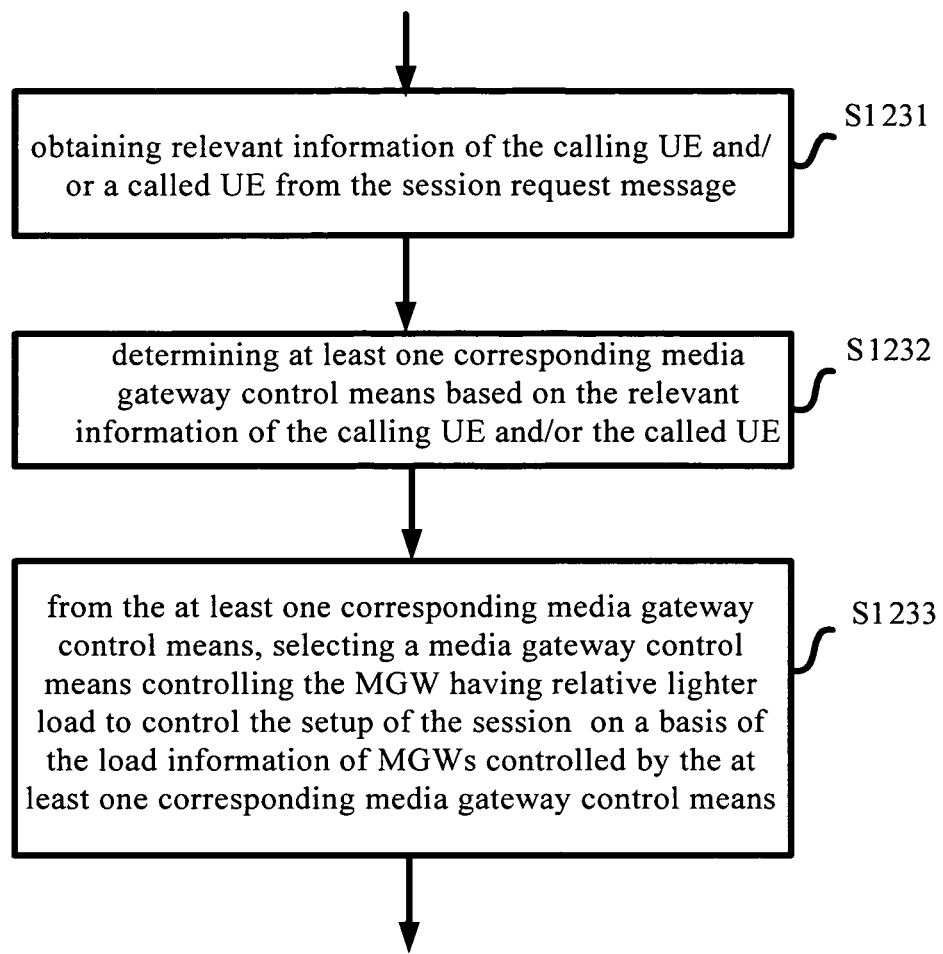
FIG. 7 depicts a schematic diagram of a flowchart of a method of selecting, based on relevant information of a calling UE and/or a called UE and load information of MGWs, an MGW to bear a session requested by a calling UE to be set up in a session manager according to an embodiment of the present invention.

In addition, in step S123, a corresponding media gateway control function is selected on a basis of relevant information of the calling UE and the called UE and the load related information of MGWs. FIG. 7 shows one embodiment of a change of step S123.

Firstly, in step S1231, the relevant information of the calling and/or called UE is obtained from the session request information received in step S121; the relevant information of the calling UE comprises a calling ID and a current location area of the calling UE; the relevant information of the called UE comprises a called ID and a current location area of the called UE. The calling/called ID comprises a fixed phone number, a mobile phone number or a calling/called ID obtained according to ENUM mechanism.

Then, in step S1232, one or multiple corresponding media gateway control function is determined based on the relevant information of the calling and/or called UE.

Finally, in step S1233, a media gateway control function controlling MGWs having relative lighter load is selected from the one or multiple corresponding media gateway control function to control the set up of the session on a basis of load related information of MGWs controlled by the one or multiple corresponding media gateway control function, preferably, a media gateway control function controlling an MGW having the lightest load is selected to control the set up of the session.

For example, when an IMS phone user in Guangzhou calls a PSTN phone user in Shanghai via an IP network, it is supposed that the phone number of the IMS phone user in Guangzhou is 020-65565665 (or a SIP address, the session manager can obtain the geography location of the user by inquiring the registration information of the user), the phone number of the PSTN phone user in Shanghai is 021-50553033, and the session manager obtains numbers of the calling and called UEs from the received session request message. It is also supposed that the session manager takes charge of breakout gateway control function in South China and East China, MGCF group is classified according to PSTN area code, information as shown in Table 2 and Table 3 is pre-stored, The lightest load information of every MGW controlled by an MGCF shown in Table 3 is updated dynamically.

Preferably, firstly, one or more MGCFs having a relative shorter network distance to the called UE is determined on a basis of the phone number of the called UE. The concept of network distance here means network path that a packet bearing a session passes by, i.e., the number of routers that a packet bearing a session passes by from an MGW to a UE, i.e., the number of hops. If the number of hops is small, the network distance is determined as short; if the number of hops is big, the network distance is determined as far.

The area code of the called UE is 021, MGCF1, MGCF2, MGCF3 and MGCF4 is determined as the corresponding plurality of MGCFs on a basis of Table 2. Then MGCF1 controlling an MGW having the lightest load is selected to control the session setup on a basis of the lightest load information of MGWs controlled by every MGCF shown in Table 3.

It is not limited to determining one or multiple MGCFs having a relative shorter network distance to the called UE on a basis of the phone number of the called UE. One or multiple MGCFs having a relative shorter network distance to the called UE can also be determined on a basis of the phone number (or a SIP address, the session manager can obtain the geography location of the user by inquiring the registration information of the user) of a calling UE. The corresponding one or multiple MGCFs can also be determined on a basis of the phone numbers of the calling and called UEs. For example, when an IMS UE in Guangzhou calls a PSTN UE in Shanghai, one or multiple MGCFs taking charge of breakout function of Hangzhou are selected as a breakout point from IMS domain to PSTN domain.

Figure 8:
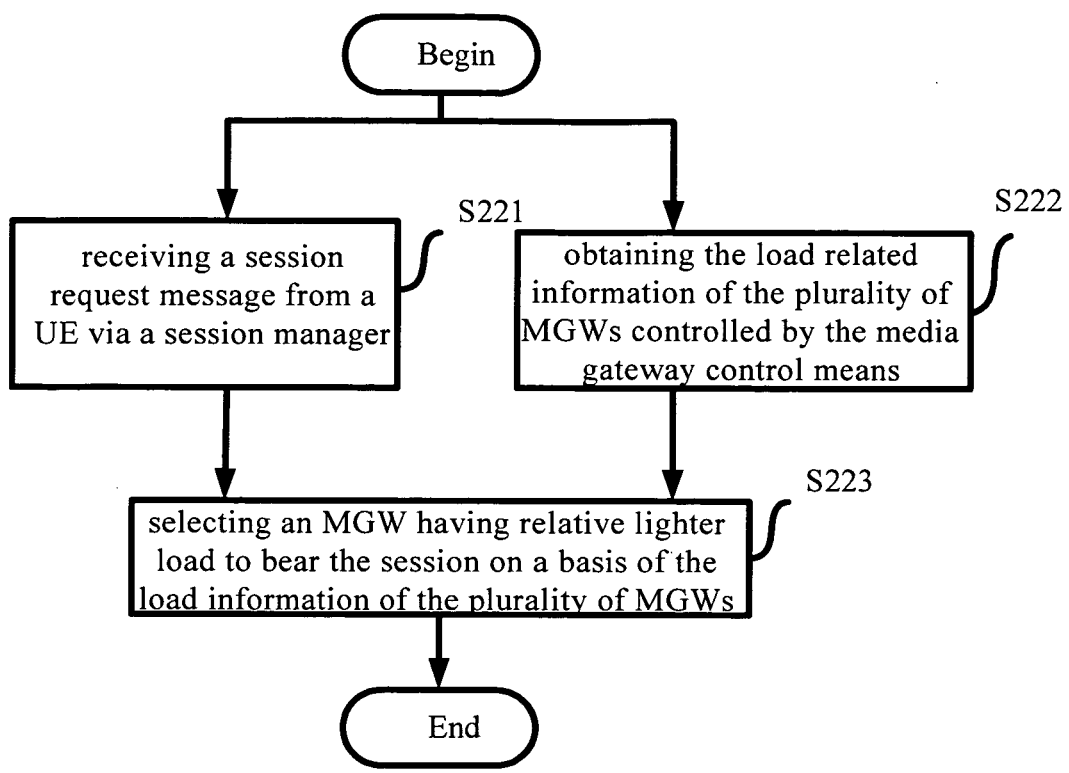
FIG. 8 depicts a schematic diagram of a flowchart of a method of selecting a route for a session requested by a calling UE to be set up in a media gateway control function according to an embodiment of the present invention.

FIG. 8 depicts a schematic diagram of a flowchart of a method of selecting a route for a session requested by a calling UE to be set up in a media gateway control function in a communication network according to an embodiment of the present invention. The method corresponds to the second route selection solution in the session manager.

Firstly, in step S221, a session request message from a UE for requesting to set up a session is received via a session manager, and in step S222, load related information of a plurality of MGWs controlled by a media control means. It should be explained that the order between step S221 and step S222 is not fixed. In practical operation, there are many ways of implementation. One choice is to inquiry the load related information of every MGW after receiving every session request message; another choice is to inquiry or to receive the load related information of every MGW periodically.

Then, in step S223, from the plurality of MGWs, an MGW having relative lighter load is selected to bear the session on a basis of the plurality of MGWs controlled by the media gateway control function.

For the IMS network shown in FIG. 1, the media gateway control function is an MGCF, when a BGCF selects MGCF1 to bear the session, the BGCF transmits the received session request message to MGCF1. When MGCF1 receives the session request message, MGCF1 selects an MGW having relative lighter load from MGWs controlled by it on a basis of load information of every MGW controlled by it, preferably, an MGW having the lightest load is selected to bear the session.

Preferably, the media gateway control function transmits load related information of MGWs controlled by it to the session manager. The load related information can comprise load information of every MGW, load information of several MGWs having relative lighter load, or load information an MGW having the lightest load.

Figure 9:
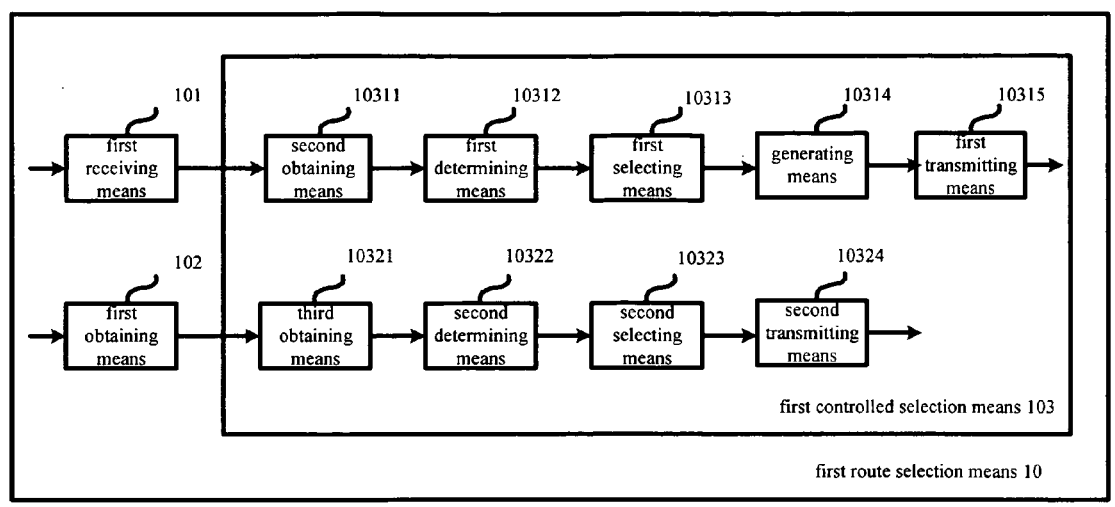
FIG. 9 depicts a structural diagram of a first route selection means for selecting a route for a session requested by a calling UE to be set up in a session manager according to an embodiment of the present invention.

FIG. 9 depicts a first route selection means 10 for selecting a route for a session requested by a calling UE to be set up in a session manager according to an embodiment of the present invention, the means 10 comprises a first receiving means 101, a first obtaining means 102 and a first controlled selection means 103.

Firstly, the first receiving means 101 receives a session request message for requesting to set up the session from the calling UE; and a first obtaining means 102 configured to obtain the load related information of the plurality of MGWs controlled by the session manager.

It needs to be explained that the order between the first receiving means 101 and the first obtaining means 102 is not fixed. In practical operation, one choice is that the first obtaining means 102 inquiries the load related information of every MGW in real time after the first receiving means 101 receives every session request message; another choice is that the first obtaining means 102 inquiries or receives the load related information of every MGW periodically.

Then, the first controlled selection means 103 selects the route for the session requested by the session request message received by the first receiving means 101 on a basis of load related information of every MGW obtained by the first obtaining means 102. There are two solutions for the route selection. One is that the first controlled selection means 103 selects an MGW to bear the session on a basis of the load related information of every MGW and informs the selection to a media gateway control function. The other is that the first controlled selection means 103 selects a media gateway control function controlling MGWs having relative lighter load on a basis of the load related information of every MGW, and then the media gateway control function selects an MGW having relative lighter load to bear the session on a basis of load related information of every MGW controlled by the media gateway control function. Corresponding to the two solutions described above, the first controlled selection means 103 can comprise two groups of sub-means.

The first group of sub-means comprises a second obtaining means 10311, a first selecting means 10313, a generating means 10314 and a first transmitting means 10315.

Firstly, the first obtaining means 103111 obtains the relevant information of the calling and/or called UE from the session request information received by the first receiving means; the relevant information of the calling UE comprises a calling ID and a current location area of the calling UE; the relevant information of the called UE comprises a called ID and a current location area of the called UE. The calling/called ID comprises a fixed phone number, a mobile phone number or a calling/called ID obtained according to ENUM mechanism.

Secondly, the first determining means 10312 determining one or multiple corresponding MGWs is determined based on the relevant information of the calling and/or called UE.

Then, the first selecting means 10313 selects an MGW having relative lighter load to bear the session from the one or multiple corresponding MGWs on a basis of load related information of the one or multiple corresponding MGWs, preferably, an MGW having the lightest load is selected to bear the session; in addition, the generating means 10314 generates indication information to indicate the selected MGW to bear the session on a basis of the selection of the first selecting means 10313.

Finally, the first transmitting means 10315 transmits the session request message and the indication information to the media gateway control function. The indication information can be comprised in the session request message and transmitted to the media gateway control function together. The indication information and the session request message can also be transmitted separately.

If there is no need to select an MGW on a basis of the relevant information of the calling and/or called UE, the second obtaining means 10311 and the first determining means 10312 can be omitted in the first group of sub-means. The first selecting means 10313 directly selects an MGW having relative lighter load, or preferably, the lightest load, from the plurality of MGWs controlled by the session manager to bear the session, and then the generating means 10314 and the first transmitting means 10315 do the generating and transmitting operations as described above separately.

The second group of sub-means comprises a third obtaining means 10321, a second determining means 10322, a second selecting means 10323 and a second transmitting means 10324.

Firstly, the third obtaining means 10321 obtains the relevant information of the calling and/or called UE from the session request information; the relevant information of the calling UE comprises a calling ID and a current location area of the calling UE; the relevant information of the called UE comprises a called ID and a current location area of the called UE. The calling/called ID comprises a fixed phone number, a mobile phone number or a calling/called ID obtained according to ENUM mechanism.

Secondly, the second determining means 10322 determines one or multiple corresponding media gateway control function based on the relevant information of the calling and/or called UE.

Then, from the one or multiple corresponding media gateway control function, the second selecting means 10323 selects a media gateway control function controlling MGWs having relative lighter load to control the set up of the session on a basis of load related information of MGWs controlled by the one or multiple corresponding media gateway control function, preferably, a media gateway control function controlling an MGW having the lightest load is selected to control the set up of the session.

Finally, the second transmitting means 10324 transmitting the session request message to the selected media gateway control function controlling MGWs having relative lighter load.

If there is no need to select a media gateway control function on a basis of the relevant information of the calling and/or called UE, the third obtaining means 10321 and the second determining means 10322 can be omitted in the second group of sub-means. The second selecting means 10323 directly selects a media gateway control function controlling MGWs having relative lighter load from the plurality of media gateway control function controlled by the session manager to bear the session, and then the second transmitting means 10324 transmits the session request message to the selected media gateway control function.

Figure 10:
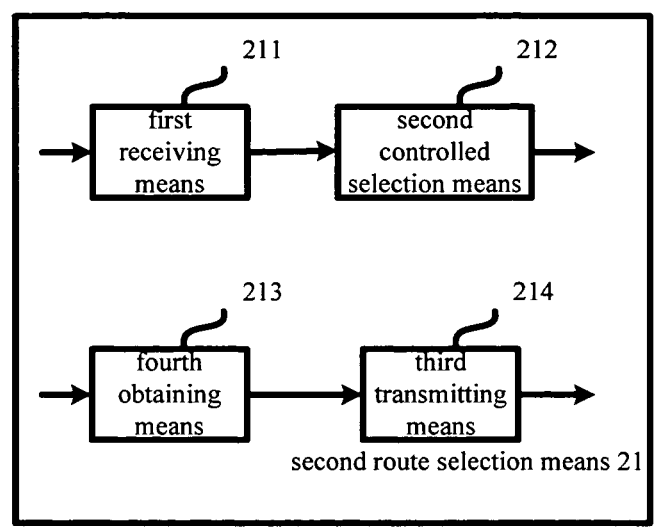
FIG. 10 depicts a structural diagram of a second route selection means for selecting a route for a session requested by a calling UE to be set up in a media gateway control function according to an embodiment of the present invention.

FIG. 10 depicts a second route selection means 21 for selecting a route for a session requested by a calling UE to be set up in a media gateway control function according to an embodiment of the present invention. The means 21 comprises a second receiving means 211, a second controlled selection means, a fourth obtaining means 213 and a third transmitting means 214. Function of the second route selection means 21 corresponds to the first group of sub-means in the first controlled selection means 103 in the first route selection means 10, i.e., when the route selection solution in the first controlled selection means 103 in the first route selection means 10 in the session manager is implemented by the first group of sub-means, correspondingly, the session setup is controlled by the second route selection means 21 in the media gateway control function.

Firstly, the second receiving means 211 receives a session request message from a UE for requesting to set up a session via a session manager, and receives an indication message from the session manager. The indication message comprises indication information for indicating an MGW selected by the session manager to bear the session.

Then, the second controlled selection means 212 selects a corresponding MGW to bear the session on a basis of the indication information.

In addition, the fourth obtaining means 213 obtains load related information of a plurality of MGWs controlled by it, and the third transmitting means 214 transmits the load related information to the session manager. The load related information here can comprise load information of every MGW, or load information of several MGWs having relative lighter load.

For an IMS network, the media gateway control function is an MGCF. When a BGCF selects MGW13 to bear the session and sends indication information to MGCF1 to inform the selection, the second route selection means 21 in MGCF1 controls MGW13 to set up the session after receiving the indication information and the session request message.

Figure 11:
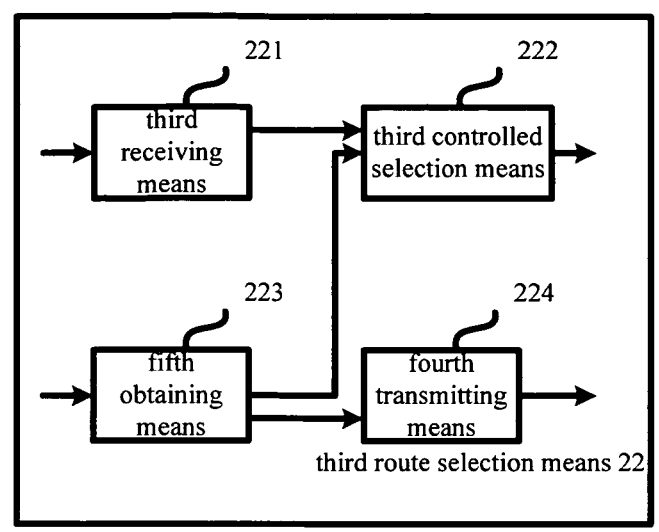
FIG. 11 depicts a structural diagram of a third route selection means for selecting a route for a session requested by a calling UE to be set up in a media gateway control function according to an embodiment of the present invention.

FIG. 11 depicts a third route selection means 22 for selecting a route for a session requested by a calling UE to be set up in a media gateway control function according to an embodiment of the present invention. The means 22 comprises a third receiving means 221, a third controlled selection means 222, a fifth obtaining means 223 and a fourth transmitting means 224. Function of the third route selection means 22 corresponds to the second group of sub-means in the first controlled selection means 103 in the first route selection means 10, i.e., when the route selection solution in the first controlled selection means 103 in the first route selection means 10 in the session manager is implemented by the second group of sub-means, correspondingly, the session setup is controlled by the third route selection means 22 in the media gateway control function.

Firstly, the third receiving means 221 receives, via a session manager, a session request message for requesting to set up the session from the calling user equipment, and the fifth obtaining means 223 obtains the load related information of the plurality of MGWs controlled by a media gateway control function.

It should be explained that the order between the operation of receiving in third receiving means 221 and the operation of obtaining in the fifth obtaining means is not fixed. In practical operation, there are many ways of implementation. One choice is that the fifth obtaining means inquiries the load related information of every MGW in real time after the third receiving means 221 receives every session request message; another choice is that the fifth obtaining means inquiries or receives the load related information of every MGW periodically.

Then, from the plurality of MGWs, the second controlled selection means selects an MGW having relative lighter load to bear the session on a basis of the plurality of MGWs controlled by the media gateway control function.

For the IMS network shown in FIG. 1, the media gateway control function is an MGCF, when a BGCF selects MGCF1 to bear the session, the BGCF transmits the received session request message to MGCF1. When MGCF1 receives the session request message, MGCF1 selects an MGW having relative lighter load from MGWs controlled by it on a basis of load information of every MGW controlled by it.

Preferably, the fourth transmitting means 224 transmits load related information of the plurality of MGWs controlled by it to the session manager. The load related information here can comprise load information of every MGW, or load information of several MGWs having relative lighter load.

Description of embodiments of the present invention is given above. It should be noted that the above-mentioned embodiments illustrate rather than limit the invention and that those skilled in the art would be able to design alternative embodiments without departing from the scope of the appended claims.

The invention claimed is:

1. A method of selecting a route for a session requested by a calling user equipment in a session manager in a communication network, comprising:
   a. receiving a session request message for requesting to set up the session from the calling user equipment; and
   b. selecting the route for the session based on load related information of a plurality of media gateways controlled by the session manager, the load related information being stored in a media gateway control function before the selecting of the route, and the load related information including a ratio between a number of channels being used for the session and a capacity of the media gateway, the capacity being a maximum number of possible channels used for the session.

2. A method as claimed in claim 1, wherein the step b comprises:
   b13. selecting, based on the load related information of the plurality of media gateways, a media gateway having relative lighter load to bear the session;
   b14. generating, based on the selection, indication information for indicating the media gateway selected to bear the session; and
   b15. transmitting the session request message and the indication information to a media gateway control function controlling the media gateway selected to bear the session.

3. A method as claimed in claim 2, wherein the step b comprises following sub-steps before the sub-step b13:
   b11. obtaining relevant information of the calling user equipment and/or a called user equipment from the session request message; and
   b12. determining at least one corresponding media gateway based on the relevant information of the calling user equipment and/or the called user equipment;
   the sub-step b13 comprises:
   selecting, from the at least one corresponding media gateway based on load related information of the at least one corresponding media gateway, a media gateway having relative lighter load to bear the session.

4. A method as claimed in claim 3, wherein the sub-step b12 comprising:
   determining at least one corresponding media gateway having relative shorter network distance to the called user equipment based on the relevant information of the called user equipment;
   wherein the sub-step b11 comprises:
   obtaining the relevant information of the called user equipment from the session request message.

5. A method as claimed in claim 3, wherein the relevant information of the called user equipment comprises a called identifier of the called user equipment and/or a current location area of the called user.

6. A method as claimed in claim 1, wherein the step b further comprises:
   b23. selecting, based on the load related information of the plurality of media gateways, a media gateway control function controlling at least one media gateway having relative lighter load to control the setup of the session; and
   b24. transmitting the session request message to the selected media gateway control function controlling the media gateway having relative lighter load.

7. A method as claimed in claim 6, wherein the step b further comprises following sub-steps before the sub-step b23:
   b21. obtaining relevant information of the calling user equipment and/or a called user equipment from the session request message; and
   b22. determining at least one corresponding media gateway control function based on the relevant information of the calling user equipment and/or the called user equipment;
   the sub-step b23 comprises:
   selecting, from the at least one corresponding media gateway control function based on the load related information of media gateways controlled by the at least one corresponding media gateway control function, a media gateway control function controlling the media gateway having relative lighter load to control the setup of the session.

8. A method as claimed in claim 7, wherein the sub-step b22 comprises:
   determining at least one corresponding media gateway control function having relative shorter network distance to the called user equipment based on the relevant information of the called user;
   wherein the sub-step b21 comprises:
   obtaining the relevant information of the called user equipment from the session request message.

9. A method as claimed in claim 1, wherein the session manager comprises a breakout gateway control means.

10. A method of selecting a route for a session requested by a user equipment in a media gateway control function in a communication network, comprising:
   i. receiving, via a session manager, a session request message for requesting to set up the session from the user equipment and receiving, from the session manager, indication information for indicating a media gateway selected by the session manager to bear the session, the indication information being based on load related information of a plurality of media gateways; and ii. selecting, based on the indication information, a corresponding media gateway to bear the session, the load related information being stored in the media gateway control function before the selecting of the corresponding media gateway, and the load related information including a ratio between a number of channels being used for the session and a capacity of the media gateway, the capacity being a maximum number of possible channels used for the session.

11. A method as claimed in claim 10, further comprising: transmitting the load related information to the session manager.

12. A method as claimed in claim 10, wherein the session manager comprises a breakout gateway control means.

13. A method of selecting a route for a session requested by a user equipment in a media gateway control function in a communication network, comprising:
   I. receiving, via a session manager, a session request message for requesting to set up the session from the user equipment; and
   II. selecting, based on load related information of a plurality of media gateways controlled by the media gateway control function, a media gateway having relative lighter load from the plurality of media gateways to bear the session, the load related information being stored in the media gateway control function before the selecting of the media gateway having the relative lighter load, and the load related information including a ratio between a number of channels being used for the session and a capacity of the media gateway, the capacity being a maximum number of possible channels used for the session.

14. A method as claimed in claim 13, further comprising: transmitting the load related information to the session manager.

15. A method as claimed in claim 13, wherein the session manager comprises a breakout gateway control means.

16. A first route selection means, in a network element, for selecting a route for a session requested by a calling user equipment in a session manager in a communication network, comprising:
   a first receiving means configured to receive a session request message for requesting to set up the session from the calling user equipment; and
   a first controlled selection means configured to select the route for the session based on load related information of a plurality of media gateways controlled by the session manager, the load related information being stored in a media gateway control function before the selecting of the route, and the load related information including a ratio between a number of channels being used for the session and a capacity of the media gateway, the capacity being a maximum number of possible channels used for the session.

17. A first route selection means as claimed in claim 16, further comprising:
   a first obtaining means configured to obtain the load related information of the plurality of media gateways controlled by the session manager.

18. A first route selection means as claimed in claim 17, wherein the first obtaining means is further configured to obtain the load related information of the plurality of media gateways via at least one media gateway control function.

19. A first route selection means as claimed in claim 16, wherein the first controlled selection means comprises:
   a first selecting means configured to select, based on the load related information of the plurality of media gateways, a media gateway having relative lighter load to bear the session;
   a generating means configured to generate, based on the selection, indication information for indicating the media gateway selected to bear the session; and
   a first transmission means configured to transmit the session request message and the indication information to a media gateway control function controlling the media gateway selected to bear the session.

20. A first route selection means as claimed in claim 19, wherein the first controlled selection means further comprises:
   a second obtaining means configured to obtain relevant information of the calling user equipment and/or a called user equipment from the session request message; and
   a first determining means configured to determine at least one corresponding media gateway based on the relevant information of the calling user equipment and/or the called user equipment;
   wherein the first selecting means is further configured to select, from the at least one corresponding media gateway based on load related information of the at least one corresponding media gateway, a media gateway having relative lighter load to bear the session.

21. A first route selection means as claimed in claim 20, wherein the first determining means is further configured to determine at least one corresponding media gateway having relative shorter network distance to the called user equipment based on the relevant information of the called user equipment;
   wherein the second obtaining means is further configured to obtain the relevant information of the called user equipment from the session request message.

22. A first route selection means as claimed in claim 20, wherein the relevant information of the called user equipment comprises a called identifier of the called user equipment and/or a current location area of the called user.

23. A first route selection means as claimed in claim 16, wherein the first controlled selection means comprises:
   a second selecting means configured to select, based on the load related information of the plurality of media gateways, a media gateway control function controlling at least one media gateway having relative lighter load to control the setup of the session; and
   a second transmission means configured to transmit the session request message to the selected media gateway control function controlling the media gateway having relative lighter load.

24. A first route selection means as claimed in claim 23, wherein the first controlled selection means further comprises:
   a third obtaining means configured to obtain relevant information of the calling user equipment and/or a called user equipment from the session request message; and
   a second determining means configured to determine at least one corresponding media gateway control function based on the relevant information of the calling user equipment and/or the called user equipment;
   wherein the second selecting means is further configured to select, from the at least one corresponding media gateway control function based on the load related information of media gateways controlled by the at least one corresponding media gateway control function, a media gateway control function controlling the media gateway having relative lighter load to control the setup of the session.

25. A first route selection means as claimed in claim 24, wherein the second determining means is further configured to determine at least one corresponding media gateway control function having relative shorter network distance to the called user equipment based on the relevant information of the called user,
- wherein the second obtaining means is further configured to obtain the relevant information of the called user equipment from the session request message.

26. A first route selection means as claimed in claim 16, wherein the session manager comprises a breakout gateway control means.

27. A second route selection means, in a network element, for selecting a route for a session requested by a user equipment in a media gateway control function in a communication network, comprising:
- a second receiving means configured to receive, via a session manager, a session request message for requesting to set up the session from the user equipment and receive, from the session manager, indication information for indicating a media gateway selected by the session manager to bear the session, the indication information being based on load related information of a plurality of media gateways; and
- a second controlled selection means configured to select, based on the indication information, a corresponding media gateway to bear the session, the load related information being stored in the media gateway control function before the selecting of the corresponding media gateway, and the load related information including a ratio between a number of channels being used for the session and a capacity of the media gateway, the capacity being a maximum number of possible channels used for the session.

28. A second route selection means as claimed in claim 27, further comprising:
- a fourth obtaining means configured to obtain the load related information of a plurality of media gateways controlled by the media gateway control function.

29. A second route selection means as claimed in claim 27, further comprising:
- a third transmission means configured to transmit the load related information to the session manager.

30. A second route selection means as claimed in claim 27, wherein the session manager comprises a breakout gateway control means.

31. A third route selection means, in a network element, for selecting a route for a session requested by a user equipment in a media gateway control function in a communication network, comprising:
- a third receiving means configured to receive, via a session manager, a session request message for requesting to set up the session from the user equipment; and
- a third controlled selection means configured to select, based on load related information of a plurality of media gateways controlled by the media gateway control function, a media gateway having relative lighter load from the plurality of media gateways to bear the session, the load related information being stored in the media gateway control function before the selecting of the media gateway having relative lighter load, and the load related information including a ratio between a number of channels being used for the session and a capacity of the media gateway, the capacity being a maximum number of possible channels used for the session.

32. A third route selection means as claimed in claim 31, further comprising:
- a fifth obtaining means configured to obtain the load related information of the plurality of media gateways controlled by the media gateway control function.

33. A third route selection means as claimed in claim 31, further comprising:
- a fourth transmission means configured to transmit the load related information to the session manager.

34. A third route selection means as claimed in claim 31, wherein the session manager comprises a breakout gateway control means.

* * * * *